J. C. Conklin,
Stone Pick.

N°. 80,146.              Patented July 21, 1868.

Witnesses:
Wm A Morgan
G. C. Cotton.

Inventor:
J. C. Conklin
per Munn & Co
Attorneys

United States Patent Office.

JOHN C. CONKLIN, OF YORKTOWN, NEW YORK.

Letters Patent No. 80,146, dated July 21, 1868.

IMPROVEMENT IN PICK-AXES.

The Schedule referred to in these Letters Patent and making part of the same.

TO ALL WHOM IT MAY CONCERN:

Be it known that I, JOHN C. CONKLIN, of Yorktown, in the county of Westchester, and State of New York, have invented a new and useful Improvement in Pick-Axes; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
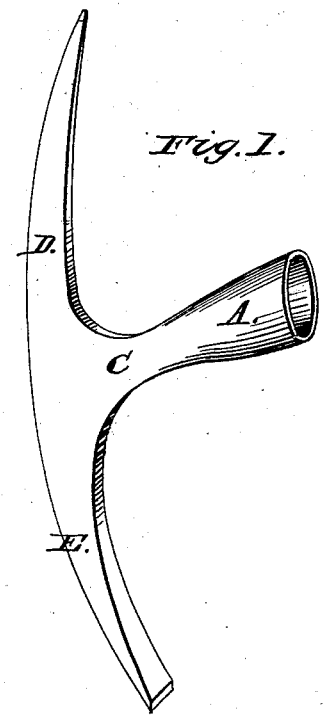
Figure 1 is a perspective view of my invention.

The object of this invention is to provide a socket for the insertion of the handle of pick-axes.

In the drawings, the parts D E of the pick are of the usual construction, the improvement being the oval socket A, joined to the pick-axe proper by means of a short shank, C, which is welded to the pick-axe after the socket is formed.

Figure 2:
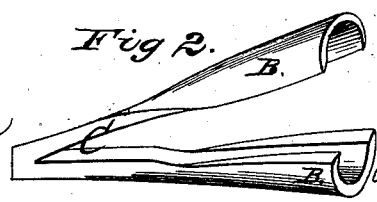
Figure 2 is a detail view of the socket, showing the manner of its construction.

The socket is formed by flattening the ends of a bar of wrought iron, and curving the same, with a proper tool, to form the socket, as shown at fig. 2.

The approximate edges of the parts B B are correspondingly bevelled, and the two parts brought together by bending the part C, forming the shank, upon itself, as shown at fig. 2.

The socket, thus far finished, is again bevelled, and the parts B B welded together, with a suitable mandrel between them, to form the socket.

The two parts forming the shank are welded together, and the latter welded to the pick-axe proper, thus forming a socket, as shown at A, fig. 1.

Having thus described my invention, I claim as new, and desire to secure by Letters Patent—

A pick-axe, D E, having a socket, A, and shank C, substantially as described, and for the purpose set forth.

JOHN C. CONKLIN.

Witnesses:
    JAMES M. CHAMPLIN,
    WILLIAM P. MARSHALL.